United States Patent
Orihashi et al.

(10) Patent No.: US 8,327,634 B2
(45) Date of Patent: Dec. 11, 2012

(54) EXHAUST HEAT RECOVERY SYSTEM

(75) Inventors: Manabu Orihashi, Toyota (JP); Tadashi Nakagawa, Aichi-ken (JP); Yoshio Hasegawa, Toyota (JP); Yasuhiro Kaya, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 814 days.

(21) Appl. No.: 12/516,476

(22) PCT Filed: Dec. 5, 2007

(86) PCT No.: PCT/IB2007/004367
§ 371 (c)(1),
(2), (4) Date: May 27, 2009

(87) PCT Pub. No.: WO2008/068632
PCT Pub. Date: Jun. 12, 2008

(65) Prior Publication Data
US 2010/0043413 A1    Feb. 25, 2010

(30) Foreign Application Priority Data
Dec. 6, 2006    (JP) .................................. 2006-329469

(51) Int. Cl.
*F01N 3/02* (2006.01)
(52) U.S. Cl. ............... 60/320; 60/275; 60/298; 60/321; 165/51; 165/52; 422/171; 422/174
(58) Field of Classification Search ........... 60/274, 60/275, 298, 300, 320, 321; 165/51, 52; 422/171, 173, 174
See application file for complete search history.

(56) References Cited

U.S. PATENT DOCUMENTS

| | | | | |
|---|---|---|---|---|
| 4,685,292 A * | 8/1987 | Brigham et al. | ............... | 60/320 |
| 5,477,676 A * | 12/1995 | Benson et al. | ................... | 60/274 |
| 6,116,022 A | 9/2000 | Woodward | | |
| 7,021,059 B2 * | 4/2006 | Shinohara et al. | .............. | 60/618 |
| 7,220,365 B2 * | 5/2007 | Qu et al. | .......................... | 252/70 |
| 7,921,640 B2 * | 4/2011 | Major | .............................. | 60/320 |
| 7,946,112 B2 * | 5/2011 | Miyagawa et al. | ............. | 60/320 |
| 2006/0054381 A1 | 3/2006 | Takemoto et al. | | |

FOREIGN PATENT DOCUMENTS
DE    199 27 246 A1    12/2000
(Continued)

OTHER PUBLICATIONS

"Notification of Reason of Refusal," issued by the Japanese Patent Office in Japanese Application No. 2006-329469, filed Dec. 6, 2006 (drafting date: Nov. 18, 2008).

*Primary Examiner* — Binh Q Tran
(74) *Attorney, Agent, or Firm* — Finnegan, Henderson, Farabow, Garrett & Dunner, LLP

(57) ABSTRACT

An exhaust heat recovery system (10) includes: an exhaust heat exchanger (18) that is communicated with a catalytic converter (16) through an exhaust gas pipe (14A), and that recovers exhaust heat into a coolant; and heat transfer restriction means (50) provided between the catalytic converter (16) and the exhaust heat exchanger (18). The heat transfer restriction means (50) includes a heat insulator (56) disposed between a first exhaust gas pipe (52) and a second exhaust gas pipe (54) that constitute the exhaust gas pipe (14A), and restrains a released heat from the catalytic converter (16) from reaching the exhaust heat exchanger (18).

13 Claims, 8 Drawing Sheets

FOREIGN PATENT DOCUMENTS

| | | |
|---|---|---|
| EP | 1 258 605 A2 | 11/2002 |
| EP | 1 445 440 A1 | 8/2004 |
| JP | 57-18707 | 1/1982 |
| JP | 5-1531 | 1/1993 |
| JP | 5-32714 | 4/1993 |
| JP | 7-25229 | 1/1995 |
| JP | 2000-145430 | 5/2000 |
| JP | 2002-147291 | 5/2002 |
| JP | 2005-16477 | 1/2005 |
| JP | 2006-250524 | 9/2006 |

* cited by examiner

EXHAUST HEAT RECOVERY SYSTEM

CROSS-REFERENCE TO RELATED APPLICATIONS

This application is a national phase application of International Application No. PCT/IB2007/004367, filed Dec. 5, 2007, and claims the priority of Japanese Application No. 2006-329469, filed Dec. 6, 2006, the contents of both of which are incorporated herein by reference.

BACKGROUND OF THE INVENTION

1. Field of the Invention

The invention relates to an exhaust heat recovery system that recovers exhaust heat of exhaust gas through heat exchange with a coolant.

2. Description of the Related Art

For example, Japanese Patent Application Publication No. 2005-16477 discloses an exhaust heat recovery device in which a coolant-exhaust heat exchanger is provided between a catalytic converter and a muffler that constitute an exhaust system of a motor vehicle. This coolant-exhaust heat recovers exhaust heat by exchanging heat between exhaust gas and the engine cooling water.

However, the engine cooling water may be overheated due to heat (e.g., conductive heat) which is transferred from the catalytic converter with large heat capacity when the engine cooling water stops circulating, for example.

SUMMARY OF THE INVENTION

The invention provides an exhaust heat recovery system that restrains a coolant from being overheated.

An exhaust heat recovery system according to one aspect of the invention includes: an exhaust heat exchanger that is communicated with a heat source through an exhaust gas channel, and that recovers exhaust heat to a coolant; and heat transfer restriction means for restraining released heat from the heat source from reaching the exhaust heat exchanger, which is provided between the heat source and the exhaust heat exchanger.

The exhaust heat recovery system according to the foregoing aspect of the invention may further include an exhaust gas pipe that is provided, between the heat source and the exhaust heat exchanger. Also, the heat transfer restriction means may be provided on the exhaust gas pipe.

In the exhaust heat recovery system according to the foregoing aspect, the exhaust gas pipe may include a first exhaust gas pipe near the heat source and a second exhaust gas pipe near the exhaust heat exchanger. Also, the heat transfer restriction means may be provided between the first exhaust gas pipe and the second exhaust gas pipe.

In the exhaust heat recovery system according to the foregoing aspect, each of the first exhaust gas pipe and the second exhaust gas pipe may be provided with a flange, and the heat transfer restriction means may be interposed between the flange of the first exhaust gas pipe and the flange of the second exhaust gas pipe, and is fixed by fastening means.

In the exhaust heat recovery system according to the foregoing aspect, the fastening means includes first fastening means for fastening one side of the heat transfer restriction means to the flange of the first exhaust gas pipe, and second fastening means for fastening the other side of the heat transfer restriction means to the flange of the second exhaust gas pipe. Also, the second fastening means may be apart from the first fastening means in a fastened state.

In the exhaust heat recovery system according to the foregoing aspect, the heat transfer restriction means may be a heat insulator.

In the exhaust heat recovery system according to the foregoing aspect, the heat transfer restriction means may be formed to extend out from an outer surface of the exhaust gas pipe.

In the exhaust heat recovery system according to the foregoing aspect, the heat transfer restriction means may be a plurality of heat radiating fins that extend out radially from the outer surface of the exhaust gas pipe.

In the exhaust heat recovery system according to the foregoing aspect, the heat transfer restriction means may be a plurality of heat radiating fins that extend out radially from the outer surface of the exhaust gas pipe when an ambient temperature is higher than or equal to a first predetermined temperature while the plurality of heat radiating fins is deformed to bend toward the exhaust gas pipe when the ambient temperature is below a second predetermined temperature that is lower than or equal to the first predetermined temperature. Also, each of the plurality of heat radiating fins may be made of shape-memory alloy.

In the exhaust heat recovery system according to the foregoing aspect, the heat transfer restriction means may be an annular-shaped heat radiating fin that extends out from the outer surface of the exhaust gas pipe.

In the exhaust heat recovery system according to the foregoing aspect, the annular-shaped heat radiating fin may be a plurality of annular-shaped heat radiating fins that are spaced from each other along an axial direction of the exhaust gas pipe.

In the exhaust heat recovery system according to the foregoing aspect, each of the first exhaust gas pipe and the second exhaust gas pipe may be provided with a flange. Also, the heat transfer restriction means may include an annular-shaped heat radiating fin that is fixed by fastening means between the flange of the first exhaust gas pipe and the flange of the second exhaust gas pipe.

In the exhaust heat recovery system according to the foregoing aspect, the heat transfer restriction means may further include a heat insulator that is interposed between the annular-shaped heat radiating fin and either one of the flange of the first exhaust gas pipe and the flange of the second exhaust gas pipe.

In the exhaust heat recovery system according to the foregoing aspect, the exhaust heat exchanger may have a heat exchange channel that is branches from and separated from the exhaust gas channel by a partition wall, and in which heat exchange between the exhaust gas and the coolant occurs.

In the exhaust heat recovery system according to the foregoing aspect, the partition wall may include an inner wall that is disposed near the exhaust gas channel and an outer wall that is spaced from the inner wall and is disposed near the heat exchange channel, and a heat-insulating layer may be formed between the inner wall and the outer wall.

In the exhaust heat recovery system according to the foregoing aspect, the inner wall may have a mirror-finished inner surface thereof.

In the exhaust heat recovery system according to the foregoing aspect, the heat exchange channel may branch from the exhaust gas channel at the farthest end portion in the partition wall from the heat source.

In the exhaust heat recovery system according to the foregoing aspect, the heat source may be a catalytic converter.

In the exhaust heat recovery system according to the foregoing aspect, the heat source may be an internal combustion engine.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

An exhaust heat recovery system 10 according to a first embodiment of the invention will be described with reference to FIGS. 1 and 2. In the following description, the terms "upstream" and "downstream" of exhaust passage indicate upstream and downstream in the flowing direction of exhaust gas.

Figure 2:
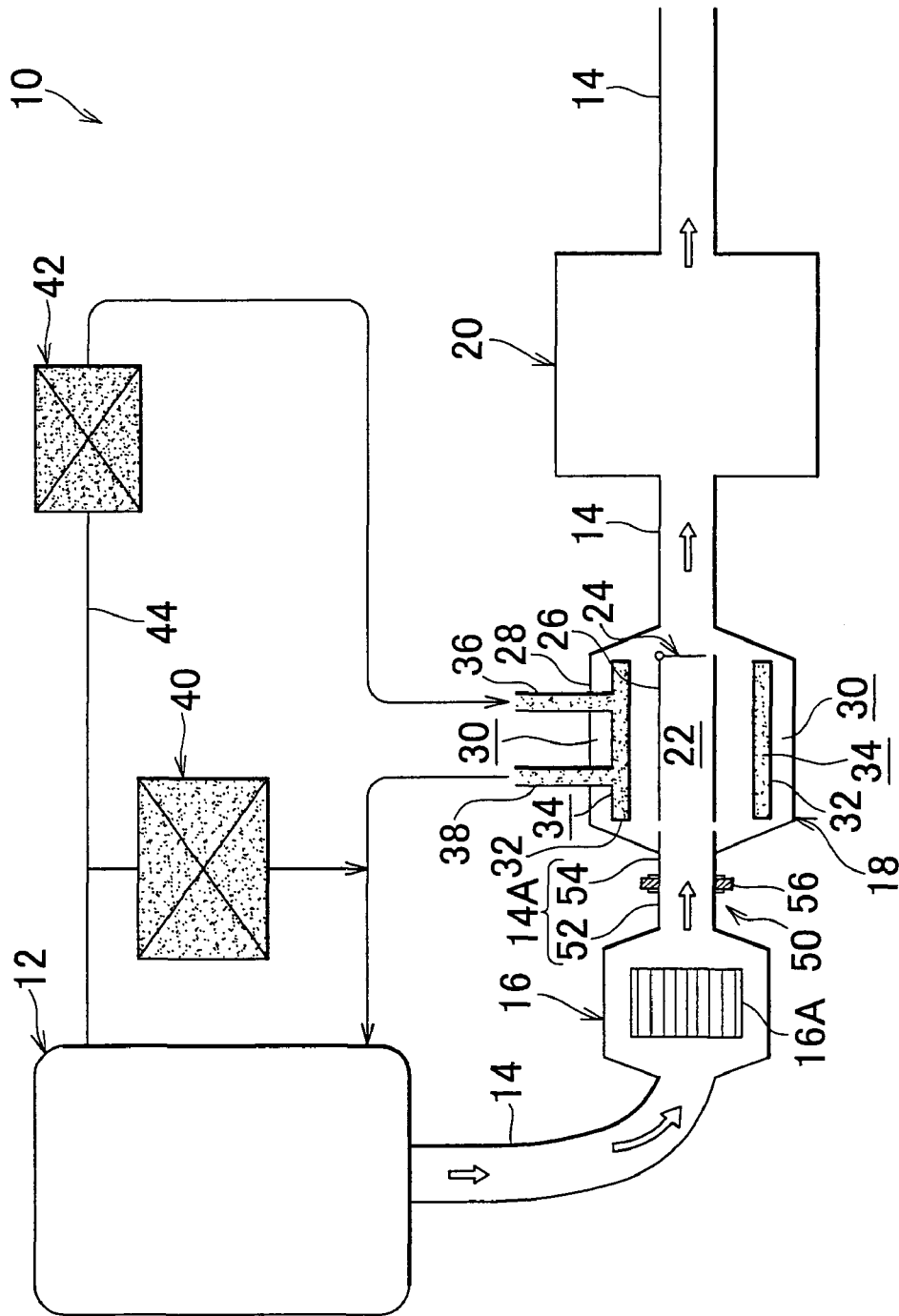
FIG. 2 is a system flow diagram schematically illustrating an overall exhaust heat recovery system according to the first embodiment of the invention.

In FIG. 2, the exhaust heat recovery system 10 is entirely shown in a schematic flow diagram. As shown in this diagram, the exhaust heat recovery system 10 recovers heat of exhaust gas in an engine (i.e., an internal combustion engine) 12 of a motor vehicle through heat exchange with engine cooling water, and uses the recovered heat for air heating in the cabin or the like, or boosting the warm-up of the engine 12.

An exhaust gas pipe 14 that forms an exhaust passage is connected to the engine 12, and leads exhaust gas out. A catalytic converter 16, an exhaust heat exchanger 18 and a main muffler 20 are disposed in that order from the upstream side of exhaust passage formed by the exhaust gas pipe 14. A catalyst 16A that is installed in the catalytic converter 16 and through which the exhaust gas passes, controls exhaust emission. The catalytic converter 16 (particularly, the catalyst 16A) which is provided upstream of the exhaust heat exchanger 18 has a large heat capacity, and is heated by high-temperature exhaust gas so that the temperature of the catalytic converter 16 during operation of the engine 12 may reach so high as to be equal to or higher than the boiling point of the engine cooling water. The catalytic converter 16 may be regarded as a "heat source" of the invention. It is to be noted that the heat source of the invention may be a component having a large heat capacity and whose temperature reaches so high as to be equal to or higher than, for example, the boiling point of the coolant while the internal combustion engine is being operated. Also, the internal combustion engine may be the heat source of the engine.

The main muffler 20 as an exhaust silencer reduces the exhaust noise that is produced when the exhaust emission controlled through the catalytic converter 16 is discharged into the atmosphere.

The exhaust heat exchanger 18 causes engine cooling water to recover exhaust heat through heat exchange between the exhaust gas and the engine cooling water. The exhaust heat exchanger 18 is provided with an exhaust gas channel 22 through which exhaust gas flows and a channel switching valve 24 for opening and closing the exhaust gas channel 22. The channel switching valve 24 may switch between "exhaust heat recovery mode", which exhaust gas exchanges heat with the engine cooling water, and "normal mode", which exhaust gas mainly passes through the exhaust gas channel 22 without substantially exchanging heat with the engine cooling water. Hereinafter, exhaust the heat exchanger 18 will be concretely described.

Figure 1:
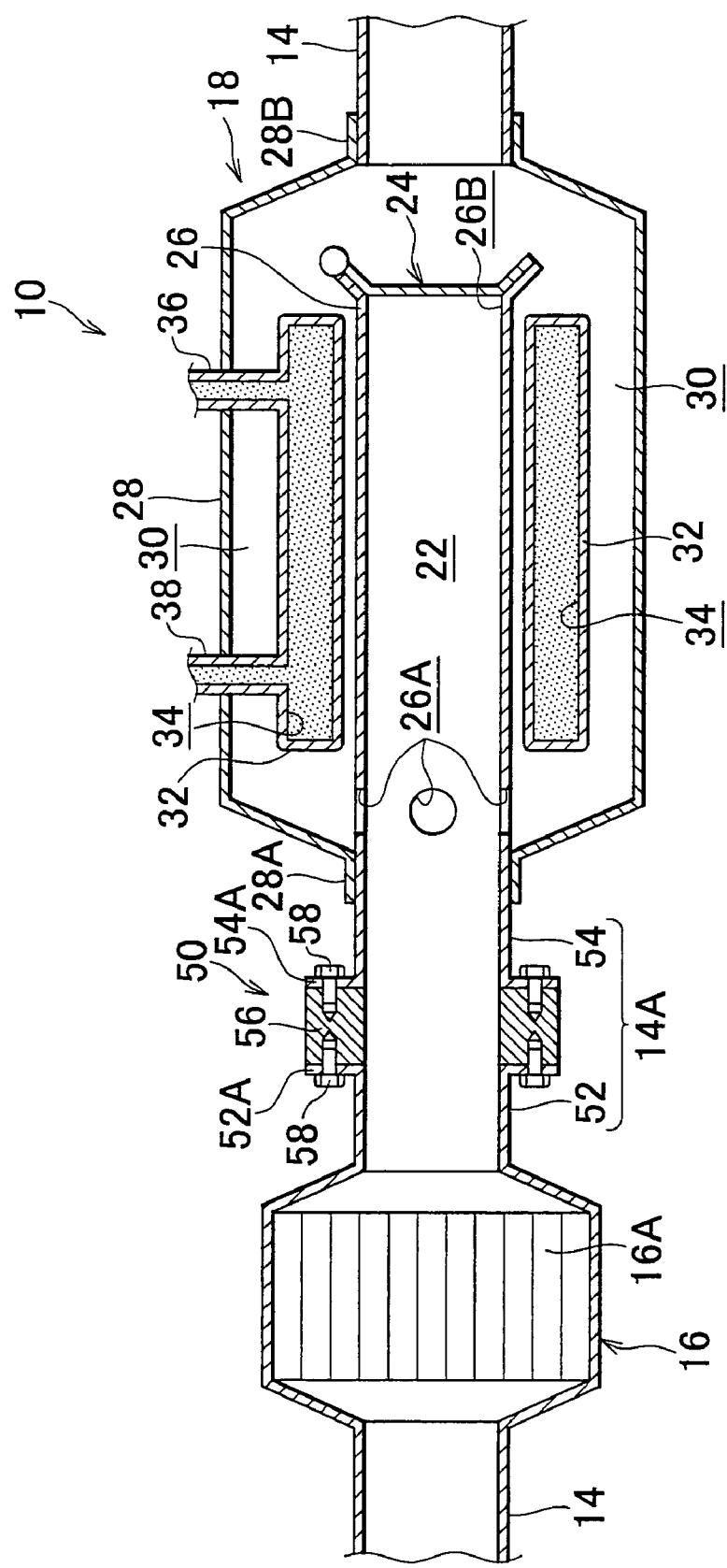
FIG. 1 is an enlarged side sectional view showing portions of an exhaust heat recovery system according to a first embodiment of the invention.

As shown in FIG. 1, the exhaust heat exchanger 18 has an inner pipe 26, and an outer pipe 28 of a shell shape. One end of the inner pipe 26 is connected to or formed integrally with one side of the exhaust gas pipe 14 on the catalytic converter 16. The outer pipe 28 covers the outer peripheral side of the inner pipe 26. Also, an upstream end 28A of the outer pipe 28 is tapered and joined to one side of the exhaust gas pipe 14 on the catalytic converter 16 exhaust gas pipe (i.e., joined to a second exhaust gas pipe 54 described later). Furthermore, a downstream end 28B of the outer pipe 28 is tapered and joined to one side of the exhaust gas pipe 14 on a main muffler 20 exhaust gas pipe. Then, an internal space of the inner pipe 26 in the exhaust heat exchanger 18 is provided as an exhaust gas channel 22, and a space between an outer periphery of the inner pipe 26 and an inner periphery of the outer pipe 28 is provided as a heat exchange gas channel 30.

The exhaust gas channel 22 and the heat exchange gas channel 30 are communicated with each other by a branching portion (i.e., communication holes 26A) provided in an upstream end of the inner pipe 26. Also, in the exhaust heat exchanger 18, the exhaust gas channel 22 and the heat exchange gas channel 30 join together downstream an opening end 26B of the inner pipe 26. In the first embodiment, the opening end 26B of the inner pipe 26 is opened and closed by the channel switching valve 24.

A cooling water pipe 32 is provided in the heat exchange gas channel 30 of the exhaust heat exchanger 18. The cooling water pipe 32 forms a cooling water heat exchange passage 34 where the engine cooling water flows inside the exhaust heat exchanger 18. In the first embodiment, for example, the cooling water heat exchange passage 34 is formed cylindrically between double-cylinder structures of the cooling water pipe 32. Alternatively, the cooling water pipe 32 may be constructed with an assembly of a plurality of straight pipes, or one or more lines of spiral pipes.

An upstream-side portion of the cooling water pipe 32 (i.e., a portion where the engine cooling water flows into the exhaust heat exchanger 18) is connected to an inlet port 36 that penetrates the wall of the outer pipe 28, and a downstream-side portion of the cooling water pipe 32 (i.e., a portion where the engine cooling water flows out of the exhaust heat exchanger 18) is connected to an outlet port 38 that also penetrates the wall of the outer pipe 28. In the first embodiment, the inlet port 36 is disposed downstream of the outlet port 38 with respect to the outer pipe 28 as shown in FIG. 1. Thus, the exhaust heat exchanger 18 has a counterflow configuration.

According to the above-described exhaust heat exchanger 18, the flow resistance (pressure loss) of the heat exchange gas channel 30 is sufficiently larger than the flow resistance of the exhaust gas channel 22 because the cooling water pipe 32 is disposed between the inner pipe 26 and the outer pipe 28. Therefore, when the channel switching valve 24 opens the inner pipe 26, (i.e., the exhaust gas channel 22), exhaust gas out of the catalyst converter 16 mainly flows through the exhaust gas channel 22 without substantially passing through the communication holes 26A. On the other hand, when the exhaust channel switching valve 24 closes the exhaust gas channel 22, exhaust gas out of the catalyst converter 16 mainly flows through the heat exchange gas channel 30 via the communication holes 26A, so that heat exchange between the exhaust gas and the engine cooling water that flows through the cooling water heat exchange passage 34 is performed.

Furthermore, in the exhaust heat recovery system 10, the channel switching valve 24 is controlled by control means (e.g., an ECU) that is not shown in the drawings. The control means controls the channel switching valve 24 to close the exhaust gas channel 22 in the case where a warm-up boost of the engine 12 is required, or in the case where the cabin heating is required when the temperature of the engine cooling water is low.

Furthermore, as shown in FIG. 2, the exhaust heat recovery system 10 further includes a front heater core 40 and a rear heater core 42 that recover heat from the engine cooling water for the purpose of the cabin heating, and a cooling water circulation passage 44 that circulates the engine cooling water to the front heater core 40 and to the rear heater core 42, respectively. In the first embodiment, the front heater core 40 and the rear heater core 42 are disposed in parallel. The exhaust heat exchanger 18 is disposed downstream the rear heater core 42 on the cooling water circulation passage 44. More specifically, the inlet port 36 of the cooling water pipe 32 is disposed downstream the rear heater core 42 on the cooling water circulation passage 44 while the outlet port 38 of the cooling water pipe 32 is disposed upstream the engine 12 on the cooling water circulation passage 44. In the first embodiment, the exhaust heat exchanger 18 is disposed in parallel with the front heater core 40 and in series with the rear heater core 42.

Therefore, in the exhaust heat recovery system 10, the engine cooling water flows along the arrows as shown on the lines of the cooling water circulation passage 44 in FIG. 2, due to the operation of a water pump (not shown) which is driven by power from the engine 12. Therefore, because the temperature of the engine cooling water out of the engine 12 is high, the engine cooling water exchanges the heat with the front heater core 40 and the rear heater core 42, in order when the engine cooling water passes through the front heater core 40 and the rear heater core 42. As a result, the heat recovered by the front heater core 40 and the rear heater core 42 is used for the cabin heating or the like. Then, the temperature of the engine cooling water drops while passing through the rear heater core 42, and the engine cooling water out of the rear heater core 42 is introduced into the exhaust heat exchanger 18, whereby undergoing heat exchange with exhaust gas. After passing through the exhaust heat exchanger 18, the engine cooling water joins together with another engine cooling water out of the front heater core 40, and is returned to the engine 12. Consequently, from the viewpoint of, for example, the cabin heating function, the exhaust heat exchanger 18 may function as a pre-heater that preheats the engine cooling water before the engine cooling water is sufficiently heated by the engine 12.

Alternatively, the arrangement of the front heater core 40 and the rear heater core 42 shown in FIG. 2 may be replaced by a parallel arrangement in which the cooling water circulation passage 44 downstream of the engine 12 branches to the front heater core 40 and the rear heater core 42 while the cooling water circulation passages from the two heater cores join upstream of the exhaust heat exchanger 18 (i.e., the inlet port 36). Furthermore, the positions of the front heater core 40 and the rear heater core 42 in FIG. 2 may be switched each other. Still further, the arrangement of the front heater core 40 and the rear heater core 42 shown in FIG. 2 may be replaced by another parallel arrangement in which the cooling water circulation passage 44 downstream of the engine 12 branches to the front heater core 40 and the rear heater core 42 while the cooling water circulation passages from the two heater cores join downstream of the exhaust heat exchanger 18 (i.e., the outlet port 38). Further, the front heater core 40 and the rear heater core 42 may also be arranged in series between the engine 12 and the exhaust heat exchanger 18 (i.e., the inlet port 36).

Hereinafter, heat transfer restriction means 50 that is disposed between the catalytic converter 16 and the exhaust heat exchanger 18 as shown in FIG. 1 will be concretely described.

In the exhaust heat recovery system 10, the exhaust gas pipe 14A exhaust gas pipe that is connected between the catalytic converter 16 and the exhaust heat exchanger 18 is divided into a first exhaust gas pipe 52 near the catalytic converter 16 and a second exhaust gas pipe 54 near the exhaust heat exchanger 18. A flange 52A is provided on a downstream end of the first exhaust gas pipe 52, and another flange 54A is provided on an upstream end of the second exhaust gas pipe 54.

In the heat transfer restriction means 50, a heat insulator 56 is interposed between the flange 52A and the flange 54A. The heat insulator 56 is formed in an annular shape from a high adiabatic material such as ceramics, and is fixed by fastening to the flange 52A and the flange 54A with bolts 58 while the heat insulator 56 is coaxially sandwiched between the flange 52A and the flange 54A.

Thus, in the exhaust heat recovery system 10, the heat transfer from the catalytic converter 16 toward the exhaust heat exchanger 18 via the exhaust gas pipe 14A is restrained by the heat insulator 56 of the heat transfer restriction means 50. Furthermore, according to the first embodiment, the bolts 58 (i.e., fastening means) are separately provided with the flange 52A and the flange 54A, respectively, so that the heat transfer from the catalytic converter 16 toward the exhaust heat exchanger 18 is further restrained by the fastening means. That is, a tip of each of the bolts 58 is apart from each other when the bolts 58 are provided with the flange 52A and the flange 54A.

Next, working of the first embodiment will be described.

In the exhaust heat recovery system 10 according to the first embodiment, for example, in the case where it is required to heat the cabin or to boost the warm-up of the engine 12 when the cooling water temperature is low, for example, immediately following a startup of the engine 12, the ECU selects the "exhaust heat recovery mode". That is, ECU drives the channel switching valve 24 to be closed and therefore the exhaust gas channel 22 is blocked at this time. Then, the exhaust gas out of the engine 12, which flows into the exhaust heat exchanger 18 (the inner pipe 26) through the exhaust gas pipe 14, is introduced into the heat exchange gas channel 30 through the communication holes 26A without flowing through the exhaust gas channel 22.

The exhaust gas that has been introduced into the heat exchange gas channel 30 undergoes heat exchange with the engine cooling water that flows in the cooling water heat exchange passage 34, so that exhaust heat is recovered by the engine cooling water. As the engine cooling water circulates through the engine 12, the front heater core 46 and the rear heater core 48, the exhaust heat is used for the warm-up of the engine and the heating of the cabin or the like. Then, the exhaust gas that has undergone the heat exchange with the engine cooling water in the heat exchange gas channel 30 comes to flow out of the exhaust heat exchanger 18, and then is discharged out of the system via the exhaust gas pipe 14 and the main muffler 20.

On the other hand, when the engine cooling water temperature becomes higher than or equal to a predetermined temperature (e.g., a temperature that either the cabin heating or the warm-up of the engine is sufficiently performed), the ECU switches the "exhaust heat recovery mode" to the "normal mode". That is, the ECU drives the channel switching valve 24 to be opened and thus the exhaust gas channel 22 is also opened at this time. As a result, the exhaust gas of the engine 12 flows mainly through the exhaust gas channel 22 without flowing through the heat exchange gas channel 30, and then flows out of the exhaust heat exchanger 18, and is discharged out of the system via the exhaust gas pipe 14 and the main muffler 20.

In this manner, in the exhaust heat exchanger 18, the recovery of exhaust heat to the engine cooling water may be switched between the on-state and the off-state by switching between the open/closed state of the exhaust gas channel 22, using the channel switching valve 24.

On the other hand, when the engine 12 is stopped, the operation of the water pump that is driven by the engine 12 is also stopped, and thus the engine cooling water is not circulated any more. Then, for example, immediately following the stop of the engine 12, heat may be released from the catalytic converter 16 with high temperature and large heat storage.

However, in the exhaust heat recovery system 10, the released heat from the catalytic converter 16 is restrained from reaching the exhaust heat exchanger 18 because the heat transfer restriction means 50 is provided between the catalytic converter 16 and the exhaust heat exchanger 18. In particular, in the exhaust heat recovery system 10, the catalytic converter 16 and the exhaust heat exchanger 18 are communicated via the exhaust gas pipe 14A as shown in FIG. 1, and the heat transfer restriction means 50 is provided on the exhaust gas pipe 14A. Thus, the released heat from the catalytic converter 16 is reliably restrained from reaching the exhaust heat exchanger 18 because the catalytic converter 16 is spaced from the exhaust heat exchanger 18 via the exhaust gas pipe 14A while the heat transfer restriction means 50 is further provided on a heat transfer passage (i.e., the exhaust gas pipe 14A).

Furthermore, the heat transfer restriction means 50 is constructed by sandwiching the heat insulator 56 having good heat insulation properties between the first exhaust gas pipe 52 and the second exhaust gas pipe 54 divided from each other along the heat-transferring direction. Therefore, the released heat from the catalytic converter 16 is further reliably restrained from reaching the exhaust heat exchanger 18.

In this manner, according to the exhaust heat recovery system 10 of the first embodiment, the released heat from the catalytic converter 16 may be reliably restrained from reaching the exhaust heat exchanger 18, and therefore the engine cooling water which remains in the cooling water heat exchange passage 34 of the exhaust heat exchanger 18 may be prevented from being overheated and boiled.

Next, a second embodiment of the invention will be described. Incidentally, the reference characters for the first embodiment or the foregoing constructions may be used for the same component parts and portions as those in the first embodiment or the foregoing constructions, and may be omitted in the following descriptions and drawings.

Figure 3:
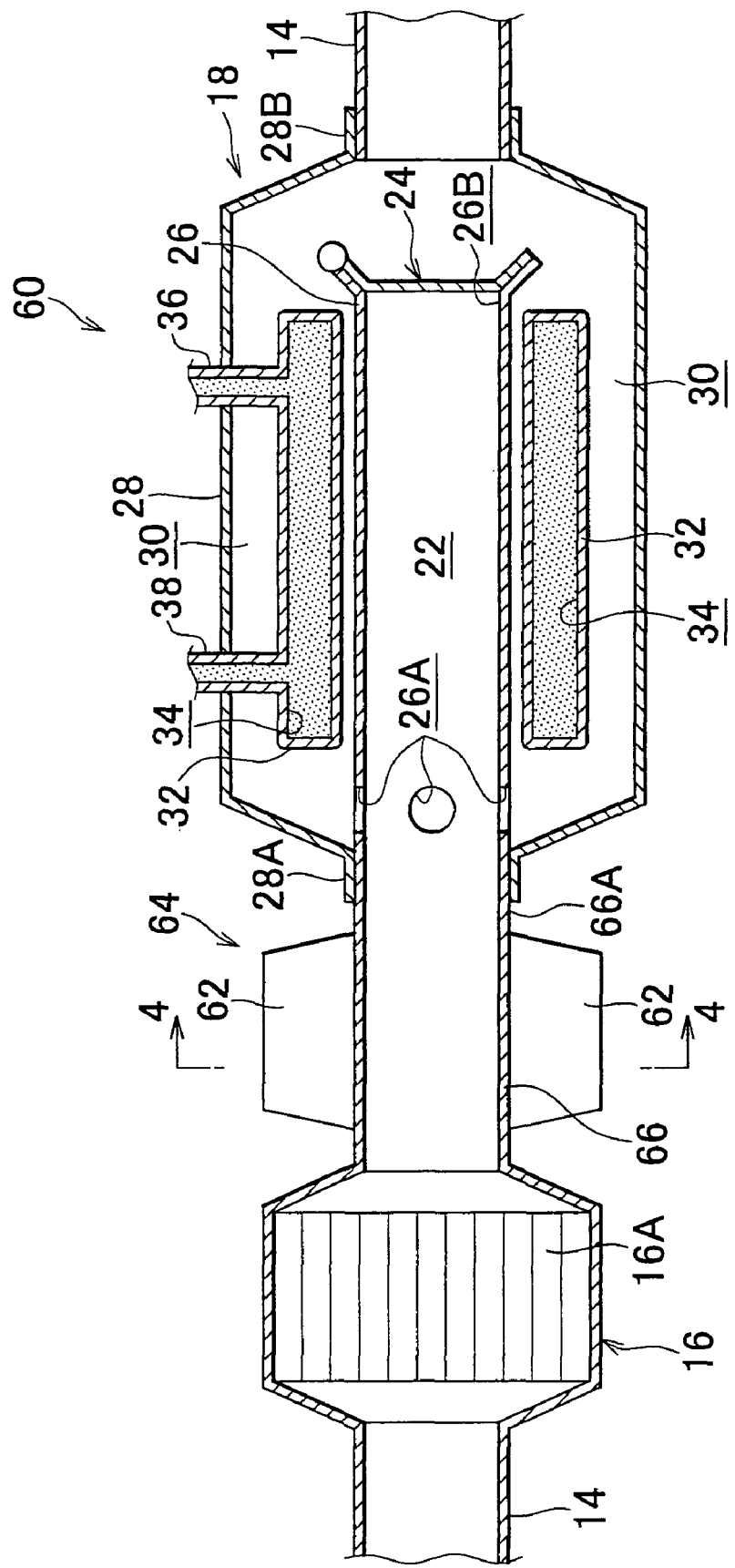
FIG. 3 is an enlarged side sectional view showing portions of an exhaust heat recovery system according to a second embodiment of the invention.

FIG. 3 shows portions of an exhaust heat recovery system 60 according to a Q second embodiment of the invention. As shown in FIG. 3, the exhaust heat recovery system 60 is different from the exhaust heat recovery system 10 of the first embodiment in that the heat transfer restriction means 50 that includes the heat insulator 56 is replaced by heat transfer restriction means 64 that includes heat radiating fins 62.

Figure 4:
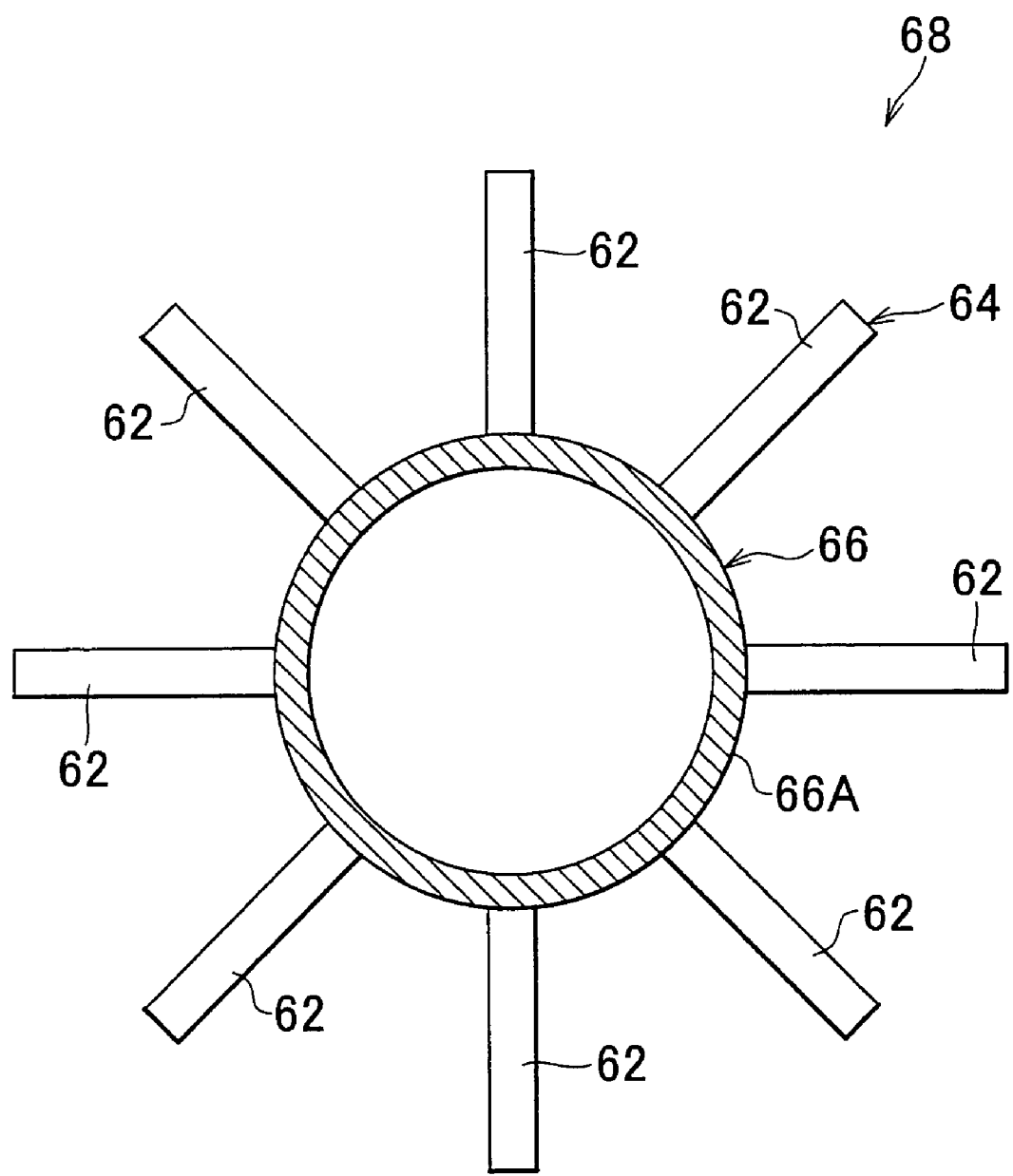
FIG. 4 is a sectional view taken on a line 4-4 of FIG. 3.

Also, in the exhaust heat recovery system 60, an exhaust gas pipe 14A of the first embodiment is replaced by a single exhaust gas pipe 66 that is not divided into two portions. The heat radiating fins 62 extend out from an outer peripheral surface 66A of an exhaust gas pipe 66. In the second embodiment, each of the heat radiating fins 62 is made of a material having a small heat capacity, such as aluminum, an aluminum alloy, and has a flat-plated shape extending in the axial direction and the radial direction of the exhaust gas pipe 66. As shown in FIG. 4, the plurality of heat radiating fins 62 is arranged radially from the outer peripheral surface 66A of the exhaust gas pipe 66. The exhaust heat recovery system 60 described above is disposed such that the heat radiating fins 62 is exposed from a lower portion of the vehicle body, and thereby contacts the outside air. Other constructions of the exhaust heat recovery system 60 according to the second embodiment are similar to the corresponding constructions of the exhaust heat recovery system 10 of the first embodiment.

Hereinafter, the operation of the exhaust heat recovery system 60 according to the second embodiment of the invention will be described as compared to the exhaust heat recovery system 10 of the first embodiment.

In the exhaust heat recovery system 60 according to the second embodiment, the transferred heat from the catalytic converter 16 to the exhaust gas pipe 66 is radiated to the outside air by the heat radiating fins 62. Therefore, in the exhaust heat recovery system 60, the released heat from the catalytic converter 16 is restrained from reaching the exhaust heat exchanger 18. In particular, in the exhaust heat recovery system 60, the catalytic converter 16 and the exhaust heat exchanger 18 are communicated via the exhaust gas pipe 66, and exhaust gas pipe the heat transfer restriction means 63 is provided on the exhaust gas pipe 66. Thus, the released heat from the catalytic converter 16 is reliably restrained from reaching the exhaust heat exchanger 18 because the catalytic converter 16 is spaced from the exhaust heat exchanger 18 via the exhaust gas pipe 66 while the heat transfer restriction means 64 is further provided on a heat transfer passage (i.e., the exhaust gas pipe 66).

In this manner, according to the exhaust heat recovery system 60 of the second embodiment, the released heat from the catalytic converter 16 may be reliably restrained from reaching the exhaust heat exchanger 18, and therefore the engine cooling water which remains in the cooling water heat exchange passage 34 of the exhaust heat exchanger 18 may be prevented from being overheated and boiled.

Figure 5A:
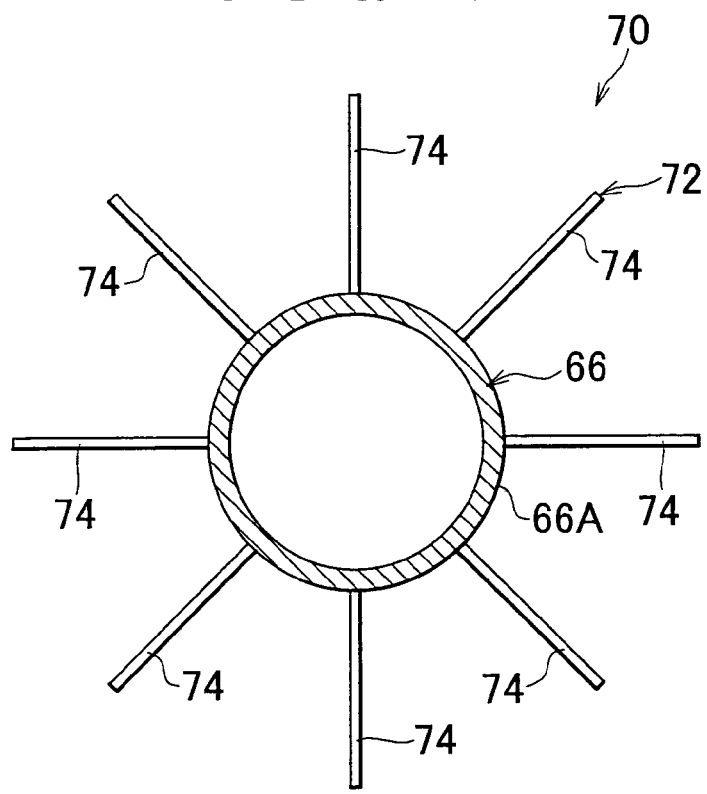
FIG. 5A is a sectional view showing heat radiating fins of an exhaust heat recovery system according to a third embodiment of the invention.
Figure 5B:
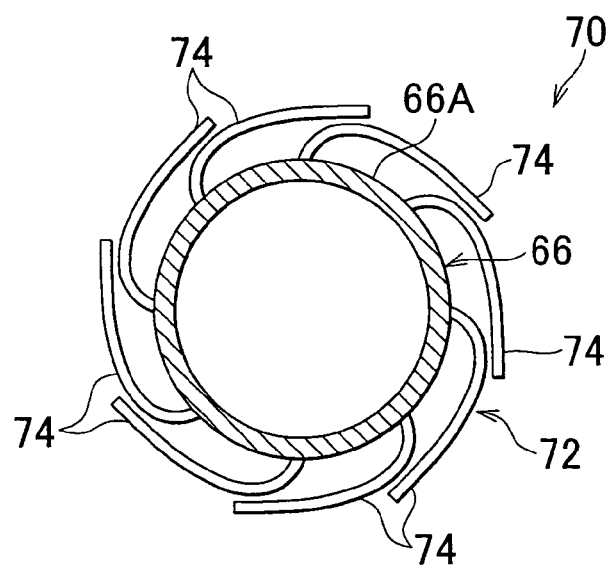
FIG. 5B is a sectional view showing a change in shape of the heat radiating fins shown in FIG. 5A.

FIGS. 5A and 5B show portions of an exhaust heat recovery system 70 according to a third embodiment of the invention with a perpendicular-to-axis sectional view corresponding to FIG. 4. As shown in FIGS. 5A and 5B, the exhaust heat recovery system 70 of the third embodiment is similar to the exhaust heat recovery system 60 of the second embodiment in that heat transfer restriction means 72 includes a plurality of heat radiating fins 74. However, the exhaust heat recovery system 70 of the third embodiment is different from the exhaust heat recovery system 60 in that each of the heat radiating fins 74 may be switched in shape between a heat-radiating posture shown in FIG. 5A and a heat radiating-restricting posture shown in FIG. 5B.

Specifically, the heat radiating fins 74 are made of a shape-memory alloy with the radiation-restricting posture as shown in FIG. 5B during an initial period. When the heat radiating fins 74 are heated to or above a first predetermined temperature T1, the heat radiating fins 74 deform and have the heat-dissipating posture as shown in FIG. 5A. On the other hand, when the heat radiating fins 74 are cooled below a second predetermined temperature T2 ($\leq$T1), the heat radiating fins 74 deform to return to the heat radiating-restricting posture. The first predetermined temperature T1 may be set, for example, slightly lower than a boiling point of the engine cooling water. Other constructions of the exhaust heat recovery system 70 are similar to the corresponding constructions of the exhaust heat recovery system 60.

Hereinafter, the operation of the exhaust heat recovery system 70 according to the third embodiment will be described as compared to the exhaust heat recovery system 60 of the second embodiment.

In the exhaust heat recovery system 70 according to the third embodiment, when the catalytic converter 16 still has a high temperature and therefore a large heat storage, for example, immediately following a stop of the engine 12, each of the plurality of heat radiating fins 74 of the heat transfer restriction means 72 has the heat-dissipating posture as shown in FIG. 5A. Therefore, in the exhaust heat recovery system 70, the transferred heat from the catalytic converter 16 to the exhaust gas pipe 66 is radiated to the outside air by the heat radiating fins 74. As a result, in the exhaust heat recovery system 70, the released heat from the catalytic converter 16 is restrained from reaching the exhaust heat exchanger 18. Consequently, the exhaust heat recovery system 70 according to the third embodiment may also achieve similar advantages through basically similar operation to the exhaust heat recovery system 60 according to the second embodiment.

On the other hand, in the exhaust heat recovery system 70, when the temperature of the plurality of heat radiating fins 74 is low, that is, when the recovery of exhaust heat toward the engine cooling water is requested, for example, immediately following a startup of the engine 12, the heat radiating fins 74 is restrained from radiating the heat to the outside air as shown in FIG. 5B, and therefore the recovery of exhaust heat is accelerated. Thus, the improvement of the heater capability within a short time and the acceleration of efficient warm-up of the engine 12 may be realized.

Figure 6:
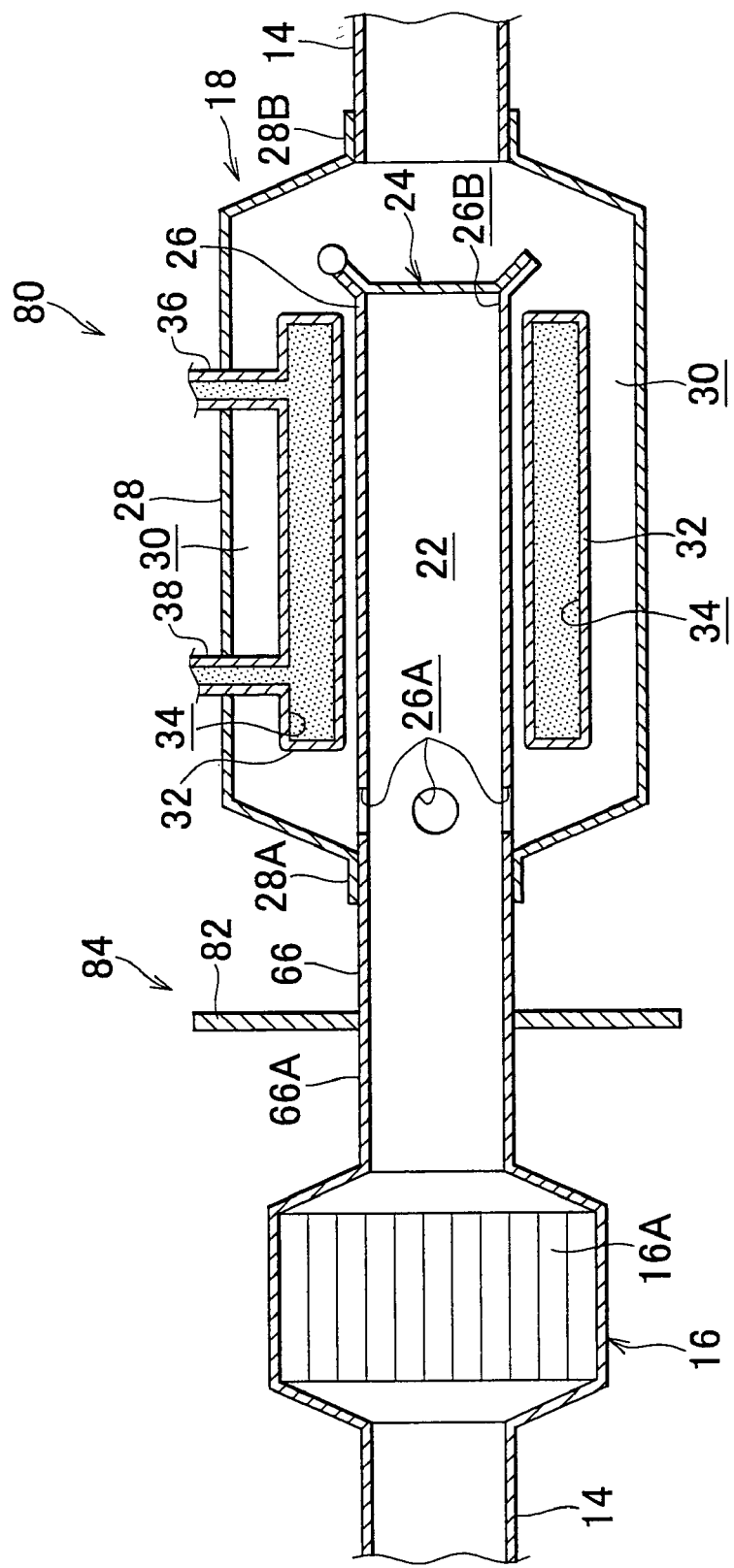
FIG. 6 is an enlarged side sectional view showing portions of an exhaust heat recovery system according to a fourth embodiment of the invention.

FIG. 6 shows portions of an exhaust heat recovery system 80 according to a fourth embodiment of the invention. As show in FIG. 6, the exhaust heat recovery system 80 is different from the exhaust heat recovery system 60 according to the second embodiment in that heat transfer restriction means 84 having an annular-shape heat radiating fin 82 is provided in the exhaust heat recovery system 80 instead of the radially extending heat radiating fins 62 as shown in FIG. 3.

The heat radiating fin 82 of the heat transfer restriction means 84 is formed into a annular shape from a material whose heat capacity is small, such as aluminum or an aluminum alloy. At least a portion of an inner periphery of the heat radiating fin 82 is fixed on an outer peripheral surface 66A of the exhaust gas pipe 66 by welding or the like. FIG. 6 shows a single heat radiating fin 82. However, a plurality of heat radiating fins 82 may also be disposed apart from each other along the axial direction of the exhaust gas pipe 66 so as to form a cylindrical arrangement. Other constructions of the exhaust heat recovery system 80 are similar to the exhaust heat recovery system 60 of the second embodiment.

Hence, the exhaust heat recovery system 80 according to the fourth embodiment may achieve similar advantages through basically similar operation to the exhaust heat recovery system 60 according to the second embodiment. Besides, in the exhaust heat recovery system 80, the heat radiating fin 82 of the heat transfer restriction means 84 may also block radiant heat from the catalytic converter 16, so that the released heat from the catalytic converter 16 may be further reliably restrained from reaching the exhaust heat exchanger 18.

Figure 7:
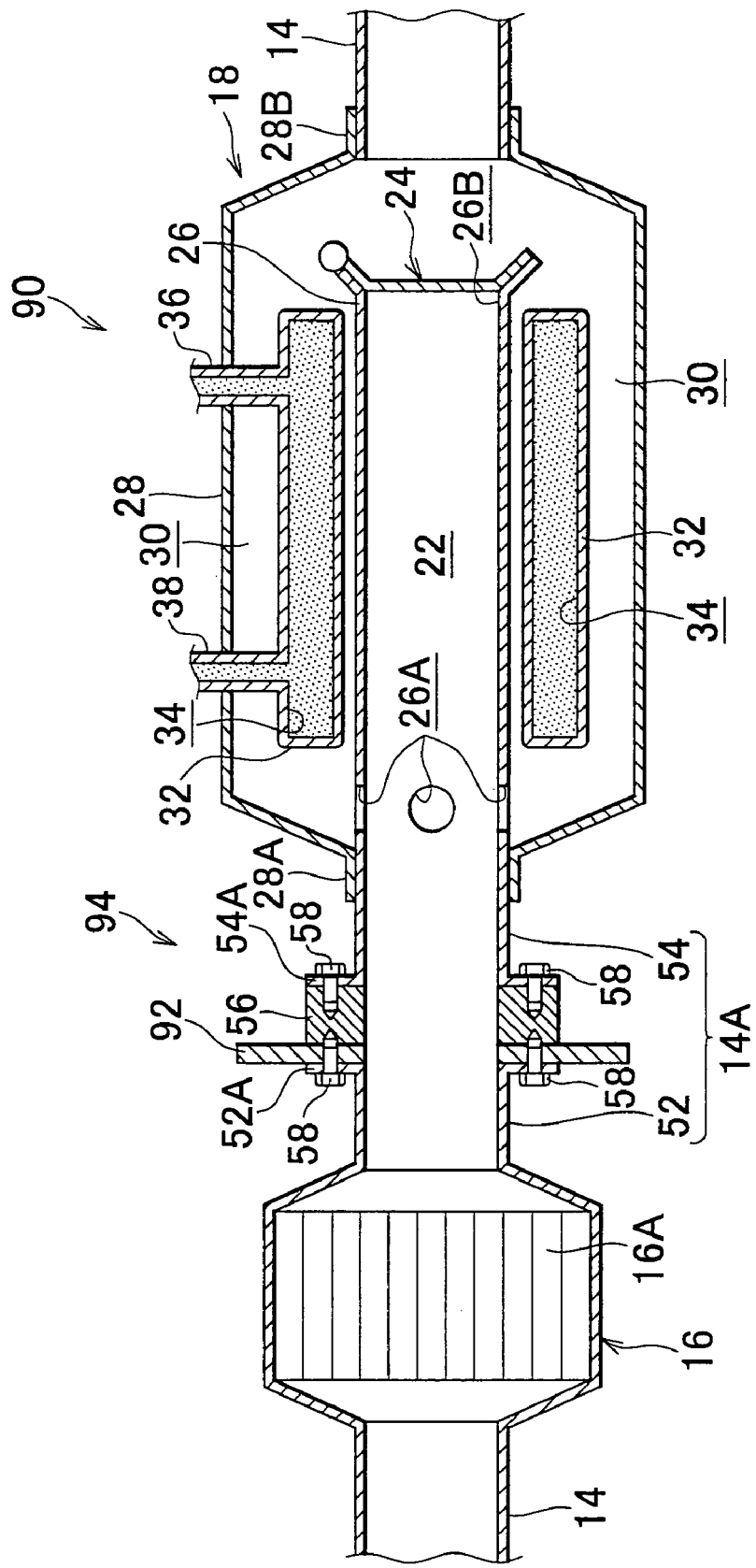
FIG. 7 is an enlarged side sectional view showing portions of an exhaust heat recovery system according to a fifth embodiment of the invention.

FIG. 7 shows portions of an exhaust heat recovery system 90 according to a fifth embodiment of the invention. The exhaust heat recovery system 90 is different from the exhaust heat recovery system 80 according to the fourth embodiment in that a heat radiating fin 92 that is fixed by fastening between flanges 52A, 54A instead of the heat radiating fin 82 fixed on the outer peripheral surface 66A of the exhaust gas pipe 66 as shown in FIG. 6.

The heat radiating fin 92 of the heat transfer restriction means 94 is formed into a annular shape from a material whose heat capacity is small, such as aluminum or an aluminum alloy. An inner edge portion of the heat radiating fin 92 is fixed by fastening between the flanges 52A, 54A as mentioned above. Also, in the fifth embodiment, a heat insulator 56 is interposed between the heat radiating fin 92 and the flange 54A. Other constructions of the exhaust heat recovery system 90 are similar to the corresponding constructions of the exhaust heat recovery system 80 of the fourth embodiment.

Hence, the exhaust heat recovery system 80 according to the fifth embodiment may achieve similar advantages through basically similar operation to the exhaust heat recovery system 80 according to the fourth embodiment. Besides, in the exhaust heat recovery system 90, because the heat transfer restriction means 94 is formed by sandwiching the heat radiating fin 92 between the flanges 52A, 54A, the thermal resistance (i.e., contact thermal resistance) therebetween further reliably restrains the released heat from the catalytic converter 16 from reaching the exhaust heat exchanger 18. Furthermore, in the exhaust heat recovery system 90, because the heat insulator 56 is further disposed on the side of the exhaust heat exchanger 18 with respect to the heat radiating fin 92, the released heat from the catalytic converter 16 may be much further reliably restrained from reaching the exhaust heat exchanger 18. Still further, because the heat radiating fin 92 is fixed by fastening instead of welding or the like on the exhaust gas pipe 14A, the material for the heat radiating fin 92 may be selected more easily. That is, for example, a material whose heat radiating property is good for the heat radiating fin 92 may be selected without any constraints on weldability or the like.

Incidentally, in the foregoing fifth embodiment, the heat transfer restriction means 94 includes the heat insulator 56. However, the invention is not limited to this construction. Alternatively, the heat insulator 56 may not be provided.

Figure 8:
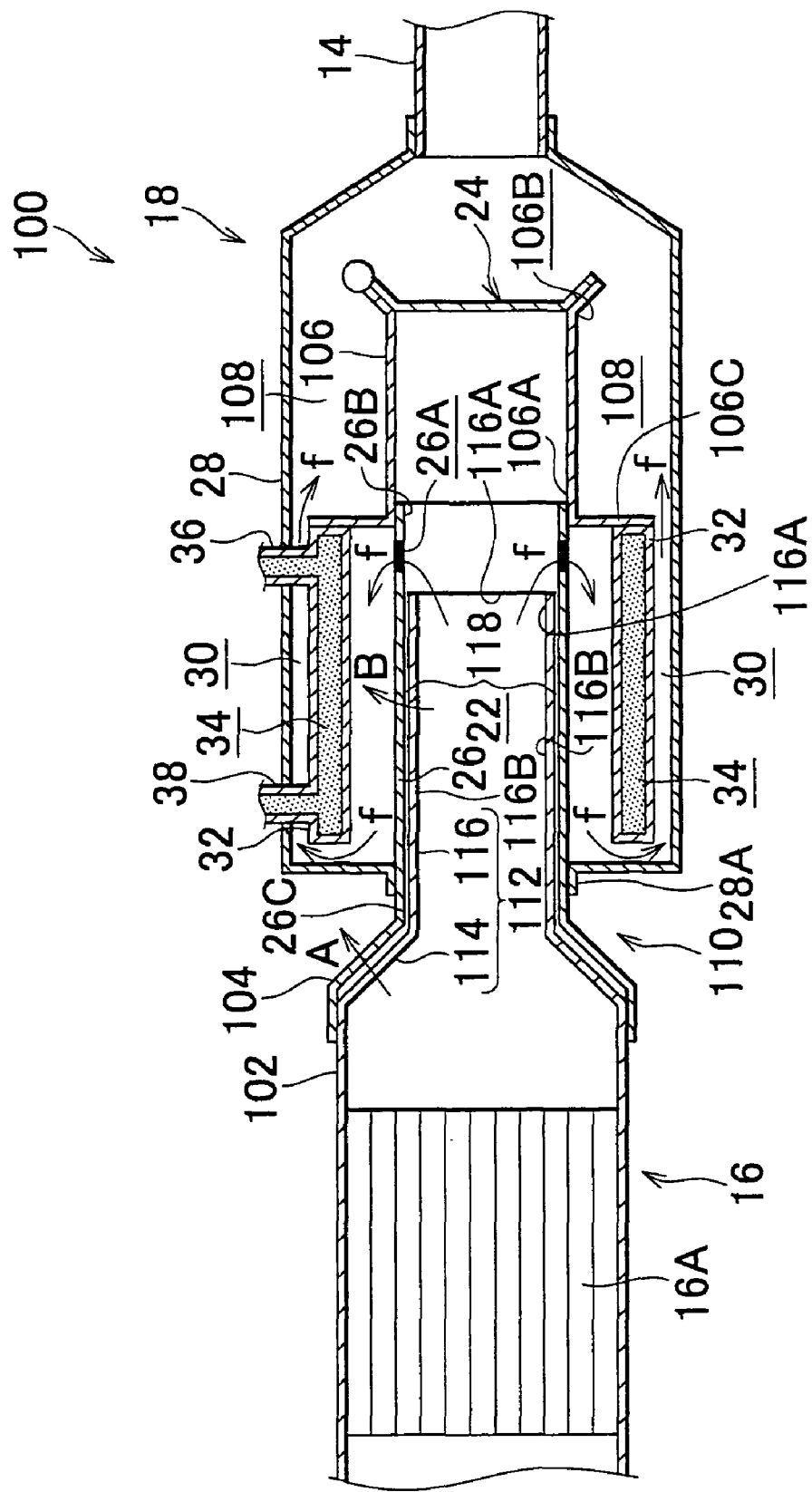
FIG. 8 is an enlarged side sectional view showing portions of an exhaust heat recovery system according to a sixth embodiment of the invention

FIG. 8 shows portions of an exhaust heat recovery system 100 according to a sixth embodiment of the invention. As shown in FIG. 8, the exhaust heat recovery system 100 is different from the systems of the first to fifth embodiments in that the catalytic converter 16 and the exhaust heat exchanger 18 are communicated without via the exhaust pipe 14A.

Concretely, a conical portion 104 that covers a portion of a downstream side of a catalyst case 102 in the catalytic converter 16 is provided integrally with an upstream end 26C of an inner pipe 26 in the exhaust heat recovery system 100. An upstream end 28A of an outer pipe 28 is butted on the side of the upstream end 26C of the inner pipe 26.

Furthermore, communication holes 26A of the inner pipe 26 are formed in the vicinity of the opening end 26B of the inner pipe 26. An upstream end 106A of an extension pipe 106 is connected to the opening end 26B of the inner pipe 26. Therefore, a post-heat exchange gas channel 108 is formed between the extension pipe 106 and the outer pipe 28. The post-heat exchange gas channel 108 communicates with a downstream end of the heat exchange gas channel 30, and the exhaust gas channel 22 via the heat exchange gas channel 30. The channel between the post-heat exchange gas channel 108 and the heat exchange gas channel 30 is constricted by a flange 106C that extends from the upstream end 106A of the extension pipe 106. In addition, because an exhaust-gas downstream end of a cooling water pipe 32 (i.e., a right-side end of the cooling water pipe 32 in FIG. 8) is in contact with the flange 106C, the exhaust gas that has flown into the heat exchange gas channel 30 through the communication holes 26A in the exhaust heat recovery system 100 is restrained from leaking from between the exhaust-gas downstream end of the cooling water pipe 32 and the flange 106C. Therefore, the exhaust gas having passed through the communication holes 26A flows around the exhaust-gas upstream end of the cooling water pipe 32, and then flows toward the outer pipe 28, as shown by the arrows, "f", in FIG. 8. Then (i.e., after exhaust heat has been recovered), the exhaust gas flows through the constricted portion between the flange 106C and the outer pipe 28, and the post-heat exchange exhaust gas is discharged into a post-heat exchange gas channel 108. Incidentally, a channel switching valve 24 is provided so as to open and close the downstream end 106B of the extension pipe 106.

The exhaust heat recovery system 100 includes heat transfer restriction means 110 for restricting mainly the radiant heat from the catalyst 16A in the catalytic converter 16 from reaching the cooling water heat exchange passage 34. Concretely, the heat transfer restriction means 110 includes a protection pipe 112 that extends downstream from the catalyst case 102 and that is disposed coaxially along inside the conical portion 104 and the inner pipe 26 without contact manner. The protection pipe 112 consists of a first protection pipe 114 that is located inside the conical portion 104, and a second protection pipe 116 that is located inside the inner pipe 26. A downstream end 116A of the second protection pipe 116 is disposed immediately upstream of the communication holes 26A.

Thus, in the heat transfer restriction means 110, a heat-insulating layer 118 in which exhaust gas does not flow is formed between the protection pipe 112 and the combination of the conical portion 104 and the inner pipe 26. Therefore, in the exhaust heat recovery system 100, the heat transfer via the conical portion 104 in the direction of an arrow, "A" in FIG. 8 and the heat transfer to the heat exchange gas channel 30 and the cooling water heat exchange passage 34 via the inner pipe 26 in the direction of an arrow, "B" in FIG. 8 are restrained. Incidentally, the conductive or radiant heat from the catalytic converter 16 is restrained from reaching the heat exchange gas channel 30 via the second protection pipe 116. In the sixth embodiment, an assembly of the heat-insulating layer 118, the inner pipe 26 as an outer wall and the second protection pipe 116 as an inner wall may be regarded as "partition wall" in the invention, which separates the exhaust gas channel 22 and the heat exchange gas channel 30 from each other.

Furthermore, in the heat transfer restriction means 110, an inner peripheral surface of the second protection pipe 116 in the protection pipe 112 is provided as a mirror surface portion 116B that is a mirror-finished surface. Therefore, in the heat transfer restriction means 110, radiant heat from the catalyst 16A is reflected by the mirror surface portion 116B. As a result, the exhaust heat recovery system 100 restrains the radiant heat from being absorbed in the heat exchange gas channel 30, that is, inward of the cooling water heat exchange passage 34. Other constructions of the exhaust heat recovery system 100 are basically similar to the corresponding constructions of the exhaust heat recovery system 10 of the first embodiment.

In the exhaust heat recovery system 100 of the sixth embodiment, during the exhaust heat recovery mode, exhaust gas flows as shown by the arrows, "f", and undergoes heat exchange with the engine cooling water that circulates through the cooling water heat exchange passage 34. On the other hand, during the normal mode, the exhaust gas of the engine 12 mainly passes through the exhaust gas channel 22, and flows out of the exhaust heat exchanger 18, whereby is discharged out of the system via the exhaust gas pipe 14 and the main muffler 20.

Then, for example, immediately after the engine 12 stops, the catalytic converter 16, which has a high temperature and a large heat storage, releases heat. It is to be noted herein that in the exhaust heat recovery system 100, because the heat transfer restriction means 110 is provided between the catalytic converter 16 and the exhaust heat exchanger 18 (in particular, the heat exchange gas channel 30 and the cooling water heat exchange passage 34), the released heat from the catalytic converter 16 may be restrained from reaching the exhaust heat exchanger 18.

Concretely, in the exhaust heat recovery system 100, because the heat-insulating layer 118 is formed along the inner pipe 26 separating the exhaust gas channel 22 and the heat exchange gas channel 30 from each other, the released heat is restrained from reaching the heat exchange gas channel 30 and the cooling water heat exchange passage 34. Furthermore, in the heat transfer restriction means 110, because the inner surface of the second protection pipe 116, corresponding to an inner wall of the partition wall in the invention, is provided as the mirror surface portion 116B, radiant heat from the catalyst 16A is reflected by the mirror surface portion 116B and is therefore restrained from being absorbed into the second protection pipe 116. The radiant heat is instead transmitted to the extension pipe 106 and the like, which are downstream of the heat exchange gas channel 30 and the cooling water heat exchange passage 34. Therefore, the radiant heat from the catalyst 16A may be further reliably restrained from reaching the heat exchange gas channel 30 and the cooling water heat exchange passage 34. Also, the mirror surface portion 116B restrains the radiant heat from being absorbed into the second protection pipe 116, and the heat-insulating layer 118 restrains the conductive heat from the second protection pipe 116 from reaching the heat exchange gas channel 30 and the cooling water heat exchange passage 34.

Furthermore, the communication holes 26A for communication between the exhaust gas channel 22 and the heat exchange gas channel 30, are formed at the downstream side of the second protection pipe 116, that is, in the farthest portion of the inner pipe 26 from the catalytic converter 16. Therefore, the radiant heat from the catalyst 16A may be restrained from reaching the heat exchange gas channel 30 directly through the communication holes 26A. This also restrains the released heat from the catalytic converter 16 from reaching the heat exchange gas channel 30 and the cooling water heat exchange passage 34.

Thus, the exhaust heat recovery system 100 according to the sixth embodiment may reliably restrain the released heat from the catalytic converter 16 from reaching the exhaust heat exchanger 18, and may prevent the engine cooling water remaining in the cooling water heat exchange passage 34 of the exhaust heat exchanger 18 from being overheated and boiled.

Incidentally, in the sixth embodiment, the heat-insulating layer 118 is formed between the inner pipe 26 and the second protection pipe 116. However, the invention is not limited to this construction. Alternatively, an inner surface of the inner pipe 26 may be provided as a mirror surface portion without providing the second protection pipe 116.

Furthermore, in the foregoing embodiments, the opening and closing of the channel switching valve 24 is controlled by the ECU. However, the invention is not limited to this construction. Alternatively, the channel switching valve 24 may be opened and closed depending on the pressure of exhaust gas. The channel switching valve 24 may also be opened and closed by a thermo-actuator that operates according to the temperature of the engine cooling water.

Furthermore, in the foregoing embodiments, the exhaust gas channel 22 (i.e., a bypass channel) is formed in the exhaust heat exchanger 18. However, the invention is not limited to this construction. Alternatively, the bypass channel may be provided in parallel with the outside of the exhaust heat exchanger 18. Also, the bypass channel may not be provided.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An exhaust heat recovery system, comprising:
   an exhaust heat exchanger that is communicated with a heat source through an exhaust gas channel, and that recovers exhaust heat to a coolant; and
   heat transfer restriction section for restraining released heat from the heat source from reaching the exhaust heat exchanger, which is provided on an exhaust gas pipe that forms the exhaust gas channel and that is provided between the heat source and the exhaust heat exchanger, wherein
   the heat transfer restriction section is a heat release member that extends out from an outer surface of the exhaust gas pipe, wherein the heat transfer restriction section takes a heat-radiating posture at which the heat transfer restriction section extends out from the outer surface of the exhaust gas pipe in a case where an ambient temperature is higher than or equal to a first predetermined temperature, whereas the heat transfer restriction section takes a heat radiating-restricting posture at which the heat transfer restriction section is closer to the exhaust gas pipe, the heat source or the exhaust heat exchanger than when the heat transfer restriction section takes the heat-radiating posture in a case where the ambient temperature is below a second predetermined temperature that is lower than or equal to the first predetermined temperature.

2. An exhaust heat recovery system, comprising:
   an exhaust heat exchanger that is communicated with a heat source through an exhaust gas channel, and that recovers exhaust heat to a coolant; and
   heat transfer restriction section for restraining released heat from the heat source from reaching the exhaust heat exchanger, which is provided between the heat source and the exhaust heat exchanger, wherein
   the exhaust heat exchanger has a heat exchange channel that is branches from and separated from the exhaust gas channel by a partition wall, and in which heat exchange between the exhaust gas and the coolant occurs,
   the heat transfer restriction section is formed by mirror-finishing a face of the partition wall of the exhaust heat exchanger, which is near the exhaust gas channel,
   the partition wall includes an inner wall that is disposed near the exhaust gas channel and that has a mirror-finished inner face, and an outer wall that is spaced from the inner wall and that is disposed near the heat exchange channel, and
   a heat-insulating layer is formed between the inner wall and the outer wall.

3. The exhaust heat recovery system according to claim 2, wherein the heat exchange channel branches from the exhaust gas channel at a farthest end portion in the partition wall from the heat source.

4. The exhaust heat recovery system according to claim 2, wherein the heat exchange channel branches from the exhaust gas channel at a farthest end portion in the partition wall from the heat source.

5. The exhaust heat recovery system according to claim 1, wherein the heat source is a catalytic converter located upstream of the exhaust heat exchanger.

6. The exhaust heat recovery system according to claim 1, wherein the heat source is a catalytic converter, and
   wherein the heat transfer restriction section is located upstream of the exhaust heat exchanger and the catalytic converter is located upstream of the heat transfer restriction section.

7. The exhaust heat recovery system according to claim 1, wherein the heat transfer restriction section includes a plurality of heat radiating fins configured to extend out radially from the outer surface of the exhaust gas pipe.

8. The exhaust heat recovery system according to claim 7, wherein the plurality of heat radiating fins are configured to extend out radially from the outer surface of the exhaust gas pipe when the heat transfer restriction section takes the heat-radiating posture, and
   wherein the plurality of heat radiating fins are configured to be bent toward the exhaust gas pipe when the heat transfer restriction section takes the heat radiating-restricting posture.

9. The exhaust heat recovery system according to claim 7, wherein the plurality of heat radiating fins are composed of a shape memory alloy.

10. The exhaust heat recovery system according to claim 1, wherein the heat source is an internal combustion engine.

11. The exhaust heat recovery system according to claim 2, wherein the heat source is a catalytic converter located upstream of the exhaust heat exchanger.

12. The exhaust heat recovery system according to claim 2, wherein the heat source is an internal combustion engine.

13. The exhaust heat recovery system according to claim 2, wherein the outer wall includes a communication hole configured to allow communication between a downstream end of the heat exchange channel and the exhaust gas channel.

* * * * *